US010647415B2

(12) United States Patent
Antraygue

(10) Patent No.: US 10,647,415 B2
(45) Date of Patent: May 12, 2020

(54) METHOD AND DEVICE FOR COUPLING PILOTING MEMBERS

(71) Applicant: RATIER FIGEAC, Figeac (FR)

(72) Inventor: Cedric Antraygue, Figeac (FR)

(73) Assignee: RATIER FIGEAC, Figeac (FR)

( * ) Notice: Subject to any disclaimer, the term of this patent is extended or adjusted under 35 U.S.C. 154(b) by 679 days.

(21) Appl. No.: 15/001,409

(22) Filed: Jan. 20, 2016

(65) Prior Publication Data

US 2016/0214704 A1    Jul. 28, 2016

(30) Foreign Application Priority Data

Jan. 27, 2015   (FR) ...................................... 15 50622

(51) Int. Cl.
| | |
|---|---|
| *B64C 13/12* | (2006.01) |
| *B64C 13/50* | (2006.01) |
| *B64C 13/04* | (2006.01) |
| *G05D 1/08* | (2006.01) |

(52) U.S. Cl.
CPC ........ *B64C 13/505* (2018.01); *B64C 13/0421* (2018.01); *B64C 13/12* (2013.01); *B64C 13/506* (2018.01); *B64C 13/507* (2018.01); *G05D 1/0808* (2013.01)

(58) Field of Classification Search
CPC ....... B64C 13/04; B64C 13/12; B64C 13/503; B64C 13/506; G05D 1/085; G05D 1/0066
See application file for complete search history.

(56) References Cited

U.S. PATENT DOCUMENTS

| | | | |
|---|---|---|---|
| 3,748,749 A | 7/1973 | Buscher et al. | |
| 5,291,113 A | 3/1994 | Hegg et al. | |
| 5,735,490 A | 4/1998 | Berthet et al. | |
| 6,128,554 A | 10/2000 | Damotte | |
| 7,648,106 B2 * | 1/2010 | Granier | B64C 13/04 244/223 |
| 8,352,098 B2 * | 1/2013 | Sataka | B64C 13/12 701/3 |
| 2005/0080945 A1 | 4/2005 | Carroll | |
| 2010/0305780 A1 * | 12/2010 | Sataka | B64C 13/12 701/3 |
| 2012/0053735 A1 * | 3/2012 | Tessier | B64C 13/04 700/275 |

(Continued)

FOREIGN PATENT DOCUMENTS

| | | |
|---|---|---|
| EP | 0 718 731 A1 | 6/1996 |
| FR | 2 708 112 A | 1/1995 |

(Continued)

OTHER PUBLICATIONS

FR Search Report, dated Oct. 15, 2015, from corresponding FR application.

*Primary Examiner* — Christopher D Hutchens
(74) *Attorney, Agent, or Firm* — Ipsilon USA, LLP

(57) ABSTRACT

A method and a device for coupling piloting members (20, 50), wherein saturation values (SCpsat−, SCpsat+, SCcopsat−, SCcopsat+) of at least one force saturator (28, 58) are adapted such that a force-feedback is exerted for each of these saturation values at a force-feedback value, taken at the force application centre of the manoeuvring handle (21, 51), of between 4 daN and 40 daN, with the result that a function of disconnecting is at least in part performed by the at least one force saturator.

16 Claims, 3 Drawing Sheets

(56) References Cited

U.S. PATENT DOCUMENTS

Figure 1:
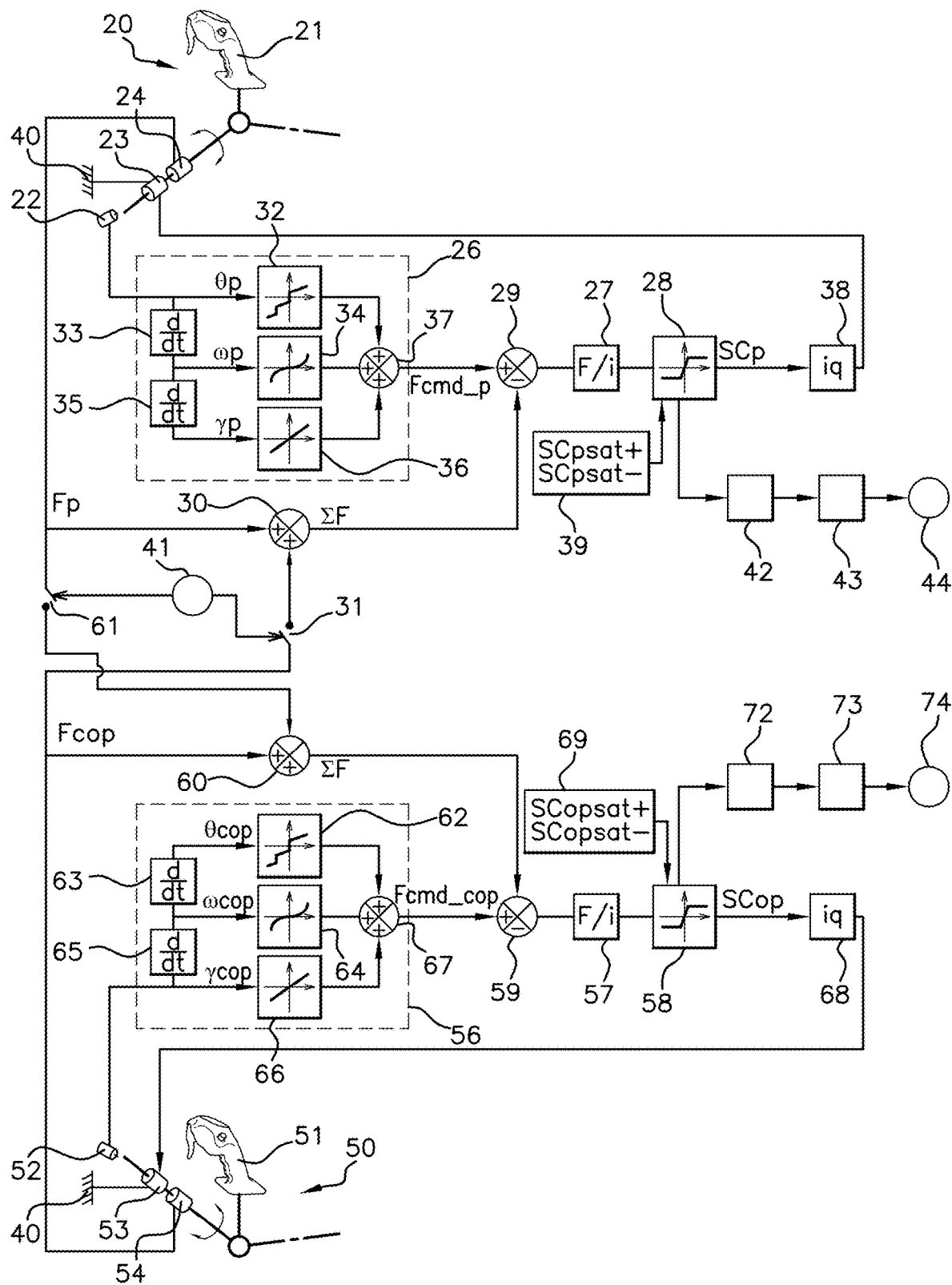

2015/0081139 A1\* 3/2015 Beggiora ................ B64C 13/04
                                                                         701/3

FOREIGN PATENT DOCUMENTS

| FR | 2 989 353 A1 | 10/2013 |
| WO | 03/040844 A2 | 5/2003 |
| WO | 2014/009639 A2 | 1/2014 |

\* cited by examiner

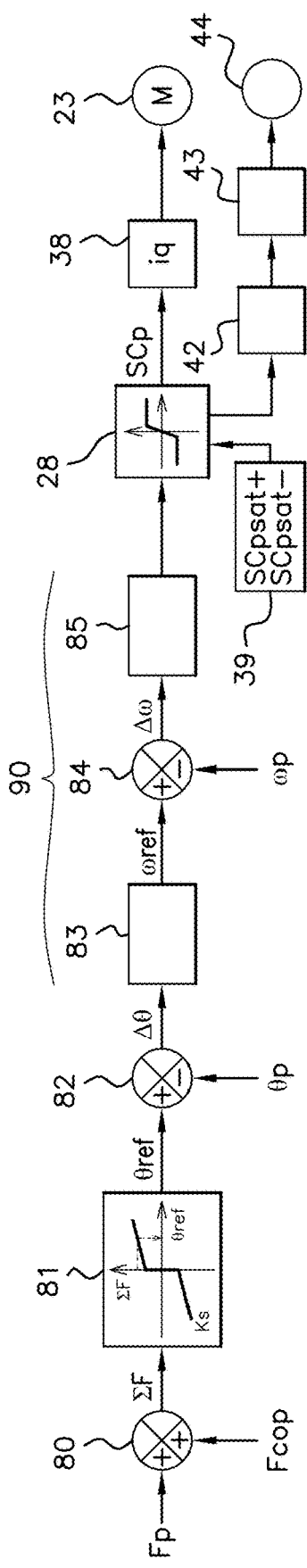
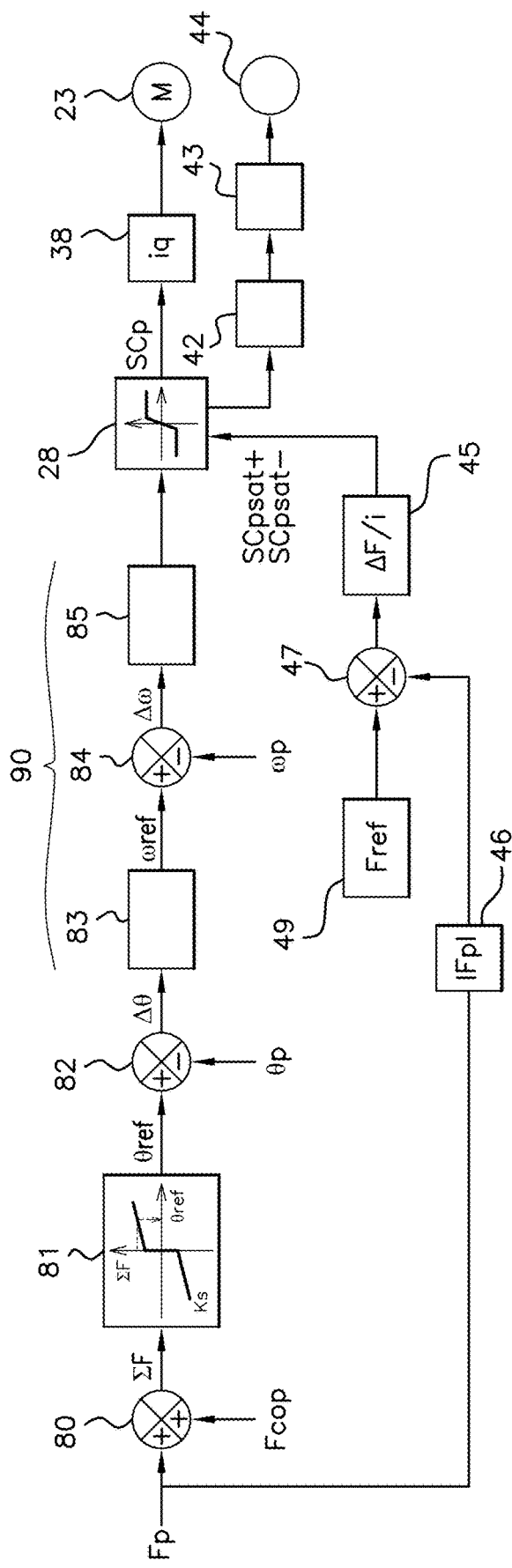

METHOD AND DEVICE FOR COUPLING PILOTING MEMBERS

The invention relates to a method and a device for coupling between a first and a second piloting member, each piloting member comprising a manoeuvring handle which is movable in relation to an underframe and at least one force actuator which is suitable for exerting a force, named a force-feedback, on the manoeuvring handle of the piloting member. It also relates to a piloting device comprising a device for coupling of this kind and implementing a method for coupling of this kind. It furthermore relates to an aircraft equipped with at least one piloting device.

Throughout the text, unless indicated otherwise, the term "piloting" and derivatives thereof mean the directing of an aircraft by at least one human pilot operating at least one piloting member such as a joystick, control lever, control column, pedal, etc. that is linked to at least one directing member such as a rudder or a throttle control of the aircraft. Furthermore, the term "force" is used equally to mean either a torque or a force, depending on the arrangement on which this force is exerted (torque if it is a matter of rotation, and force if it is a matter of translation). The term "directing member" means any member whereof the position or condition affects the flight of the aircraft: this may in particular cover rudders, motors, rotor blades, etc. The term "control" and derivatives thereof mean, in a manner traditional in aeronautics, the fact of supplying to a device signals that bring about a predetermined action by the device. The expression "at least substantially" means, as is conventional, that a structural feature, such as a value, or a functional feature must not be interpreted as indicating an abrupt discontinuity, which would make no sense in physical terms, but covers not only this structure or function but also minor variations in this structure or function which, in the technical context under consideration, produce an effect of the same kind if not of the same extent.

In the particular case of a side stick for piloting an aircraft, the piloting member is mounted and guided to rotate by means of a pot-type joint or by two pivotal links with axes at least substantially at a right angle and intersecting (so forming a link rotating about a central point) that enable pitching and rolling movements to be imparted.

Traditionally, a piloting device for an aircraft comprises at least one piloting member that is linked, at least partly by a drive train, to at least one directing member—in particular a rudder, a motor, etc.—of the aircraft, and where appropriate at least one motorised actuator, named the actuator, having a driving member that is connected within the drive train such that automatic piloting is permitted and/or a specific dynamic behaviour of the piloting member is simulated, in order to bring about a return to neutral and appropriate sensations (in particular sensations of muscular force) permitting or facilitating piloting by a human pilot.

Traditional piloting devices, named devices having mechanical controls, comprise a drive train that links the piloting members to the directing members wholly mechanically. Piloting devices, named fly by wire devices, in which the directing members are not linked entirely mechanically by a drive train to the piloting members, have been developed for piloting certain aircraft. These fly by wire piloting devices have a partial drive train comprising at least one mechanism for mounting and guiding each piloting member that is mounted and guided in relation to an underframe integrally formed with the aircraft, and having a set of position and/or force sensors that are linked to flight control systems (usually named fly by wire flight control systems, or FCS) that generate control signals for an at least partially electrical input servo control that actuates one or more directing members.

When an aircraft has to be piloted simultaneously by a pilot and a co-pilot, it is known to link the piloting members or joysticks of each of the two pilots to one another such that each joystick moves in a manner under the servo control of the other joystick, and such that each pilot can feel at his or her joystick the force and/or movement exerted by the other pilot on his or her own joystick. Using the traditional piloting devices having mechanical controls, this coupling of the piloting members is achieved by a set of connection rods or cables that mechanically link the two piloting members.

Coupling the piloting members in this way is also known in the case of piloting devices having electrical controls (cf. in particular U.S. Pat. Nos. 3,748,749, 5,291,113, US 2005/0080945, etc.).

U.S. Pat. No. 5,291,113 describes in particular a piloting device comprising a device for coupling that couples together the movements and forces applied to the joysticks of the pilot and co-pilot. This piloting device comprises, for each piloting member, a manoeuvring handle that is linked to a force sensor (in the form of a torque sensor) and a position sensor. Each torque sensor supplies a signal representing the torque exerted/felt by the pilot (or the co-pilot) on the manoeuvring handle. From the position signal supplied by the position sensor and a force-feedback value formed by the total of the torque signals, a comparator forms a torque error that is then applied to an electronic controller which supplies an appropriate electrical control current to an electric motor in order to correct this torque error and modify the torque felt by the pilot (or the co-pilot). A device for coupling of this kind has the disadvantage of simulating a link comparable to a rigid connecting rod between the piloting members of the pilot and the co-pilot. In mechanical systems, a connecting rod of this kind is normally accompanied by devices that disconnect the pilots' joysticks when the force generated by the one on the other exceeds a predetermined limit.

US 2005/0080945 also describes a piloting device which comprises coupling piloting members, and which comprises an estimator of the opposing forces allowing the piloting members to be decoupled when the difference in the forces exceeds a determined value. In particular, implementation of this disconnection requires the sign of the forces applied and their difference to be detected a plurality of times, and hence requires numerous detectors and components that are complex, costly, bulky and heavy and that reduce reliability.

WO 2014/009639 describes a device for coupling that comprises a correction device comprising a correction loop that is adapted to limit the force-feedback value as a function of at least one parameter selected from the absolute value of the piloting force of a piloting member and the difference between the values of the piloting forces of each piloting member. The control current of each actuator is furthermore limited by a saturator to a predetermined current saturation value in order to protect the actuator. Typically, the saturation value applied by a saturator of this kind corresponds to the maximum torques supplied by the actuator, that is to say a force-feedback value at the control handle that is generally greater than 50 daN. In that case too, although this correction device performs well, it is costly, bulky and heavy. Moreover, if it is adapted to an impedance control (measurement of the position of the piloting member and servo control of the force), it is not applicable to an admittance control (measurement of the force on the piloting member and servo control of its position, as described for example in FR 2 708 112).

The object of the invention is thus to obviate these disadvantages by proposing a method and a device for coupling piloting members which are simultaneously simpler, require fewer components, are less costly, less bulky and lighter in weight. It also has the object of proposing a method of this kind and a device of this kind for coupling that are compatible with an admittance control as well as with an impedance control.

The invention thus relates to a method for coupling piloting members, with each piloting member comprising:
a manoeuvring handle which is movable in relation to an underframe and has a force application centre,
at least one force actuator which is suitable for exerting a force, named a force-feedback, on the manoeuvring handle of the piloting member, in which method:
a servo device delivers a control signal that is supplied to each force actuator of each piloting member, the force-feedback being exerted on each manoeuvring handle at a force-feedback value determined by the control signal supplied to each force actuator of the piloting member, at a value of this control signal that is determined by the servo device to ensure a coupling link between the piloting members,
the said value of the control signal is limited by at least one saturator, named a force saturator, of the said servo device such that it remains within a range of values [SCpsat−, SCpsat+], [SCcopsat−, SCcopsat+] delimited by saturation values SCpsat−, SCpsat+, SCcopsat−, SCcopsat+,
the said servo device is adapted to perform a function of disconnecting the piloting members when the disconnection conditions are met, characterised in that the saturation values SCpsat−, SCpsat+, SCcopsat−, SCcopsat+ are adapted such that the force-feedback is exerted for each of these saturation values at a force-feedback value, taken at the force application centre of the manoeuvring handle, of between 4 daN and 40 daN, with the result that the function of disconnecting is at least in part performed by the said at least one force saturator of the servo device.

The invention also relates to a device in which a method for coupling according to the invention is implemented. It relates to a device for coupling between piloting members, each piloting member comprising:
a manoeuvring handle which is movable in relation to an underframe and has a force application centre,
at least one force actuator which is suitable for exerting a force, named a force-feedback, on the manoeuvring handle of the piloting member,
this device for coupling comprising a servo device that delivers a control signal that is supplied to each force actuator of each piloting member, the force-feedback being exerted on each manoeuvring handle at a force-feedback value determined by the control signal supplied to each force actuator of the piloting member, at a value of this control signal that is determined by the servo device to ensure a coupling link between the piloting members,
the servo device comprising at least one saturator, named the force saturator, limiting the said value of the control signal of each piloting member such that it remains within a range of values [SCpsat−, SCpsat+], [SCcopsat−, SCcopsat+] delimited by saturation values SCpsat−, SCpsat+, SCcopsat−, SCcopsat+,
and in which the servo device is also adapted to perform a function of disconnecting the piloting members when the disconnection conditions are met,
characterised in that the servo device is adapted such that the saturation values SCpsa−, SCpsat+, SCcopsat−, SCcopsat+ are such that the force-feedback exerted for each of these saturation values has a force-feedback value, taken at the force application centre of the manoeuvring handle, of between 4 daN and 40 daN, with the result that the function of disconnecting is at least in part performed by the said at least one force saturator of the servo device.

The invention also relates to a method for coupling that is implemented in a device according to the invention.

Thus, in a method and a device for coupling according to the invention, the function of disconnecting piloting members, which consists in inhibiting the said coupling link between the piloting members, results at least in part in a specific choice of the said saturation values SCpsat−, SCpsat+, SCcopsat−, SCcopsat+, which are less than those (from 50 daN to 100 daN) in the prior art, in which when a saturator is provided for control of an actuator the saturation values applied by this saturator are determined solely in order to protect the actuator from too high a control current. In a device and a method for coupling according to the invention, the saturation values SCpsat−, SCpsat+, SCcopsat−, SCcopsat+ of the force saturators are by contrast selected such that the force-feedback corresponds, for these saturation values, to the force-feedback values at the said application centre of the manoeuvring handle that correspond to predetermined conditions for disconnecting the piloting members.

In a method and a device for coupling according to the invention, it is no longer necessary to provide a correction loop. Thus, in certain embodiments, advantageously and according to the invention, the function of disconnecting piloting members is realised exclusively by the said at least one force saturator. In a device according to the invention, the servo device is in that case adapted such that the function of disconnecting is realised exclusively by the said at least one force saturator; the device for coupling according to the invention is in particular free of any specific circuitry other than the said at least one force saturator, in order to limit the force-feedback value applied to each piloting member and to perform the said function of disconnecting.

Given this, there is nothing to prevent the provision—as a variant—that the said function of disconnecting is also at least in part performed by components of the device for coupling other than the said at least one force saturator, for example for certain degrees of freedom of the manoeuvring handle and/or for certain directions of displacement and/or of force of the manoeuvring handle.

A method for coupling according to the invention is furthermore advantageously characterised by all or some, as a variant or in combination, of the following features:
at least one—in particular each—of the saturation values SCpsat−, SCpsat+, SCcopsat−, SCcopsat+ is a predetermined fixed value,
at least one—in particular each—of the saturation values SCpsat−, SCpsat+, SCcopsat−, SCcopsat+ is variable and is delivered to the said at least one force saturator by a dynamic monitoring circuit of the said at least one force saturator,
at least one of the saturation values SCpsat−, SCpsat+, SCcopsat−, SCcopsat+ is determined by the said dynamic monitoring circuit as a function of a difference between a measured force exerted on the manoeuvring handle and a reference value, at least one reference value for at least one of the saturation values SCpsat−, SCpsat+, SCcopsat−, SCcopsat+ is a predetermined fixed value, at least one reference value for at least one of the saturation values SCpsat−, SCpsat+, SCcopsat−, SCcopsat+ is a variable value dependent on a measurement of at least one dynamic status parameter of the manoeuvring handle that is selected from position, speed and acceleration, at least one of the saturation values SCpsat−, SCpsat+, SCcopsat−, SCcopsat+ is stored in a memory of the said at least one force the saturation values SCpsat− and SCcopsat−, and SCpsat+ and SCcopsat+ respectively, of the piloting members in a single direction of displacement of the manoeuvring handles are the same (fixed or dynamically variable), the saturation values SCpsat−, SCpsat+, SCcopsat−, SCcopsat+ are all the same (fixed or dynamically variable), the piloting members are formed by a first piloting member and a second piloting member, the servo device is adapted to carry out an admittance control of each force actuator of each piloting member (measurement of the force exerted on the manoeuvring handle of the piloting member and servo control of its position), the servo device is adapted to carry out an impedance control of each force actuator of each piloting member (measurement of the position of the manoeuvring handle of the piloting member and servo control of the force-feedback exerted by the force actuator).

Similarly, a device for coupling according to the invention is furthermore advantageously characterised by all or some, as a variant or in combination, of the following features:

the said at least one force saturator is adapted such that at least one—in particular each—of the saturation values SCpsat−, SCpsat+, SCcopsat−, SCcopsat+ is a predetermined fixed value, the said at least one force saturator comprises a memory in which at least one—in particular each—of the saturation values SCpsat−, SCpsat+, SCcopsat−, SCcopsat+ is stored, it comprises a dynamic monitoring circuit of the said at least one force saturator that is adapted for delivery to the said at least one force saturator of at least one, which is variable, of the saturation values SCpsat−, SCpsat+, SCcopsat−, SCcopsat+; in particular, the dynamic monitoring circuit of the said at least one force saturator is adapted to deliver to the said at least one force saturator each of the saturation values SCpsat−, SCpsat+, SCcopsat−, SCcopsat+, which is thus variable, the said dynamic monitoring circuit comprises a regulation loop of at least one—in particular each—of the saturation values SCpsat−, SCpsat+, SCcopsat−, SCcopsat+ as a function of a difference between a measured force value exerted on the manoeuvring handle as delivered by at least one force-measuring sensor and a reference value, the said dynamic monitoring circuit is adapted to have at least one predetermined fixed reference value for at least one—in particular each—of the saturation values SCpsat−, SCpsat+, SCcopsat−, SCcopsat+, the said dynamic monitoring circuit comprises, for at least one of the saturation values SCpsat−, SCpsat+, SCcopsat−, SCcopsat+, at least one sensor for measuring at least one dynamic status parameter of the manoeuvring handle that is selected from position, speed and acceleration, and is adapted to adopt, as reference value, a variable value dependent on at least one measurement value as delivered by the said at least one sensor for measuring at least one dynamic status parameter of the manoeuvring handle that is selected from position, speed and acceleration, the servo device is adapted such that the saturation values SCpsat− and SCcopsat−, and SCpsat+ and SCcopsat+ respectively, of the piloting members in a single direction of displacement of the manoeuvring handles are the same (fixed or dynamically variable), the servo device is adapted such that the saturation values SCpsat−, SCpsat+, SCcopsat−, SCcopsat+ are all the same (fixed or dynamically variable), the piloting members are formed by a first piloting member and a second piloting member, the servo device is adapted to carry out an admittance control of each force actuator of each piloting member (measurement of the force exerted on the manoeuvring handle of the piloting member and servo control of its position), the servo device is adapted to carry out an impedance control of each force actuator of each piloting member (measurement of the position of the manoeuvring handle of the piloting member and servo control of the force-feedback exerted by the force actuator)

each piloting member comprises a force saturator specific thereto.

The invention further relates to a piloting device comprising at least two piloting members—in particular two piloting members—and a device for coupling these piloting members according to the invention. It furthermore relates to a piloting device comprising at least two piloting members—in particular two piloting members—that is adapted to implement a method for coupling according to the invention of these piloting members.

The invention furthermore relates to an aircraft comprising a piloting device according to the invention.

The invention also relates to a method for coupling piloting members, a device for coupling piloting members, a piloting device—in particular an aircraft piloting device—and an aircraft that are characterised in combination by all or some of the features mentioned above or below.

Figure 2:
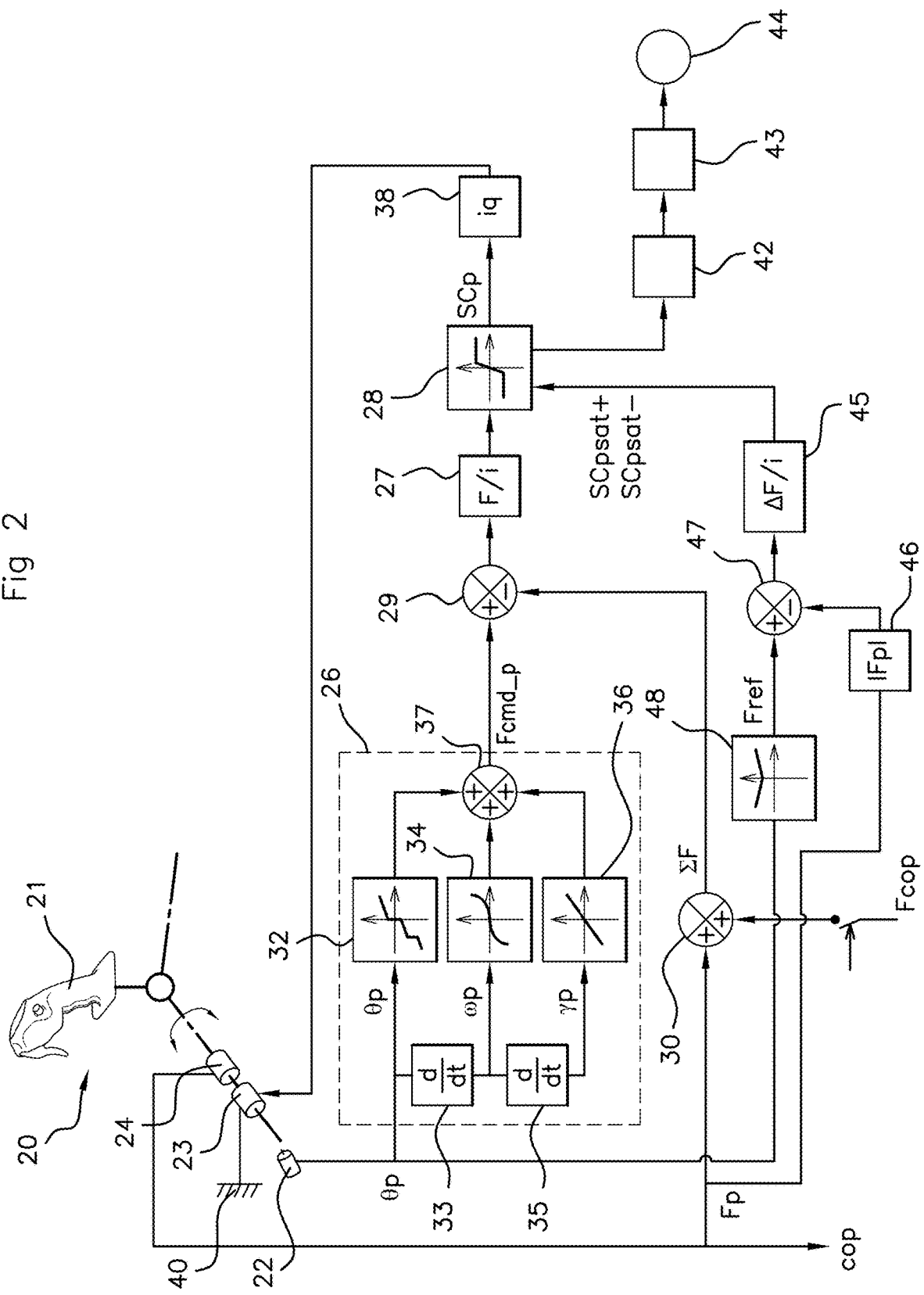

Other objects, features and advantages of the invention will become apparent on reading the description below, which is given in non-restrictive manner and which refers to the attached figures, in which:

FIG. 1 is a block diagram of a device for coupling according to a first embodiment according to the invention, with an impedance control and saturation values that are predetermined and fixed, FIG. 2 is a partial block diagram of a device for coupling according to a second embodiment according to the invention, representing a servo device of a piloting member with an impedance control and saturation values that are variable and controlled dynamically, FIG. 3 is a partial block diagram of a device for coupling according to a third embodiment according to the invention, representing a servo device of a piloting member with an admittance control and saturation values that are predetermined and fixed, FIG. 4 is a diagram similar to FIG. 3, representing a second embodiment according to the invention, representing a servo device of a piloting member with an admittance control and saturation values that are variable and controlled dynamically.

FIG. 1 shows two piloting members, in the present case side sticks 20 and 50 for piloting aircraft. These side sticks comprise a manoeuvring handle 21 (and 51 respectively), with each manoeuvring handle being adapted to be manipulated by a pilot (or a co-pilot respectively). In the embodiment shown, these manoeuvring handles are rotatably movable about two axes that are substantially at a right angle. Notwithstanding this, the invention also applies to other embodiments, in particular those with manoeuvring handles that are rotatably movable on a pot-type joint or with manoeuvring handles that are movable by linear movements. In the example shown, only one of the two axes, for example the pitch axis, of each piloting member is shown in full, it being possible to infer the other axis, for example the roll axis, by analogy. In this example, the forces exerted are forces in relation to a rotation and so the term "torque" will be used to designate it, without this being interpretable as a restriction, since the invention may equally be applied for example in the case of control levers having linear movement, in which case the force exerted is a force along the axis of translation of the control lever.

The side stick 20, for example that dedicated to the pilot (captain of the aircraft), comprises for each axis at least one torque sensor 24 that is adapted to supply a signal representing the value of the force, in the present case a torque Fp, exerted by the pilot on the manoeuvring handle 21. The torque sensor 24 is linked on the one hand to the manoeuvring handle 21 and on the other to an electric motor 23 that is adapted to exert a torque $\Delta F$ on the axis of the manoeuvring handle. The rotor of the electric motor 23 may for example be connected to a shaft of the manoeuvring handle along the pitch axis, in which case its stator is linked to an underframe 40 of the piloting member. A position sensor 22 is also mounted on the pitch axis and enables supply of a position signal $\theta p$, in this case of the angular position, of the manoeuvring handle 21. It goes without saying that the side stick 20 may also comprise "passive" elements such as springs or shock absorbers that are placed between the shaft of the manoeuvring handle and the underframe 40.

In a manner symmetrical thereto, the side stick 50 that is dedicated to the co-pilot comprises a manoeuvring handle 51, a torque sensor 54 supplying a signal representing the value of the torque Fcop exerted by the co-pilot on his or her manoeuvring handle, an electric motor 53 and a position sensor 52 delivering an item of information relating to the angular position $\theta cop$ of the manoeuvring handle 51 of the co-pilot.

In the text and the figures, when parameters refer to the piloting member of the pilot they are given the index "p". When the same parameters refer to the piloting member of the co-pilot, they are given the index "cop".

The side stick 20 of the pilot comprises calculation means comprising an impedance control block 26 that is adapted to receive the position signal $\theta p$ supplied by the position sensor 22 and to supply a theoretical control force Fcmd_p which the pilot should exert on the manoeuvring handle 21.

The position signal $\theta p$ coming from the position sensor 22 is transmitted directly to a reference table 32 that is adapted to supply a first value for the control force as a function of the position $\theta p$.

The signal $\theta p$ is also differentiated with respect to time to give a first derivative 33 in order to supply a signal $\omega p$ corresponding to the speed of displacement of the manoeuvring handle 21. This signal $\omega p$ is transmitted to a second reference table 34 that is adapted to supply a value for the force corresponding to a shock-absorbing force as a function of the speed of displacement of the manoeuvring handle 21.

Similarly, the signal $\omega p$ is used to give a second derivative 35 with respect to time in order to supply a signal $\gamma p$ representing the acceleration of the manoeuvring handle 21. This signal $\gamma p$ is transmitted to the input of a third reference table 36 to obtain a value for the control force corresponding to the inertia of the manoeuvring handle 21.

It should be noted that the values $\omega p$ and $\gamma p$ may be measured directly by the speed and acceleration sensors rather than being calculated from the position signal $\theta p$.

The three control force values are then added to one another in a summer 37 to provide a value Fcmd_p representing the resultant of the theoretical control force.

This theoretical control force Fcmd_p is transmitted to a comparator 29, in which it is compared to a value $\Sigma F$ of the sum of the forces Fp and Fcop measured by the torque sensors 24 and 54 respectively.

The value $\Sigma F$ is delivered by a summer 30, which on the one hand receives the value Fp of the torque exerted by the pilot on his or her manoeuvring handle as delivered by the torque sensor 24, and on the other receives the value Fcop of the torque exerted by the co-pilot on his or her manoeuvring handle as delivered by the torque sensor 54, by way of a coupling switch 31 that is controlled by a coupling signal delivered by a coupling controller 41. When the coupling switch 31 is open, the two piloting members 21, 51 are no longer coupled, with only the value Fp of the torque exerted by the pilot on his or her manoeuvring handle being taken into account by the comparator 29. By contrast, when the coupling switch 31 is closed, the two piloting members are coupled, with the sum $\Sigma F$ of the measured forces Fp and Fcop being taken into account by the comparator 29.

The comparator 29 delivers a signal corresponding to a torque error to a controller 27, in which this torque error is converted to a signal of electrical current intended for the electric motor 23.

The output from the controller 27 is transmitted to a saturator 28, named the force saturator 28, in which the current signal delivered by the controller 27 is limited to predetermined saturation values SCpsat+, in a first direction of the force exerted on the manoeuvring handle 21, and SCpsat− in the other direction of the force exerted on the manoeuvring handle 21. The output from the force saturator 28 delivers a control signal SCp for the electric motor 23 that is representative of a variation in torque to be applied to the shaft of the pitch axis of the manoeuvring handle 21.

In this first embodiment, the saturation values SCpsat+, SCpsat− used by the force saturator 28 are predetermined fixed values stored in a memory 39. Advantageously, these values are adjustable, it being possible to write to the memory 39 in order to enable the device for coupling to be configured as a function of the features required for the piloting device, at the time of manufacture thereof and/or at the user's request.

A manoeuvring handle has a gripping zone intended to receive a pilot's hand, and an application centre of the resultant of the forces transmitted between the manoeuvring handle and the pilot's hand may be defined in the central part of this gripping zone, at the centre of the palm of the pilot's hand, regardless of the direction and sign of the force exerted or felt by the pilot on his or her manoeuvring handle.

The saturation values SCpsat+, SCpsat− are selected and adjusted according to the invention in order to produce a function of disconnecting the two side sticks 21, 51. Thus, the saturation values SCpsat+, SCpsat− are selected such that the force-feedback applied to the manoeuvring handle 21 by the electric motor 23 when the control signal SCp is equal to one or other of these saturation values SCpsat+, SCpsat− brings about a force on the manoeuvring handle 21 whereof the absolute value measured at the force application centre of the manoeuvring handle 21 is between 4 daN and 40 daN. In effect, a given force for a given drive train corresponds to a given current. In practice, the saturation values SCpsat+, SCpsat− may be determined by experiment once a force-feedback value has been selected at the force application centre of the manoeuvring handle 21 that is between 4 daN et 40 daN, by placing a dynamometer at this force application centre and varying the different values of the control signal SCp until the selected value is obtained. It should be noted that in practice this method allows all the forces, transmission ratios, friction and losses in the drive train linking the electric motor 23 to the force application centre of the manoeuvring handle 21 to be taken into account.

It should also be noted that, taking into account the asymmetry of the forces that a pilot applies to his or her manoeuvring handle, it is not necessary to make the saturation value SCpsat+ in one direction of the force exerted on the manoeuvring handle 21 equal to the saturation value SCpsat− in the other direction of the force exerted on the manoeuvring handle 21. In any case, to achieve the function of disconnecting the side sticks, the two saturation values SCpsat+, SCpsat− are both selected to bring about a force of between 4 daN and 40 daN at the said force application centre of the manoeuvring handle 21.

In fact, this range of values of forces at the said force application centre of the manoeuvring handle 21, which is well below the values of forces corresponding to the saturation limits imposed by the saturators in the prior art (50 daN to 100 daN), by this simple arrangement enables the bringing about of an automatic disconnection function between the two side sticks 21, 51. In fact, when the forces exerted by the pilot and the co-pilot are in opposition, whether this is an impedance control or an admittance control, the control current of the motor of each manoeuvring handle increases so that this opposition is felt, and as soon as this control current reaches the saturation value of the saturator 28 this control current no longer rises as it should, which brings about a relative movement between the manoeuvring handle of the pilot and the manoeuvring handle of the co-pilot.

The saturator 28 may advantageously take the form of software performing comparisons. As a variant, it may also take the form of an electronic device, in particular with simple analogue comparators.

A saturation detector 42 is associated with the force saturator 28 in order to detect the fact that the output from the force saturator 28 has a value equal to one or the other of the saturation values SCpsat+, SCpsat−. The signal delivered by this saturation detector 42 is supplied via a filter 43 to software 44 that in particular allows the triggering of warning signals and/or actions for the pilot and/or co-pilot.

The control signal SCp is supplied to the input of a power circuit 38 which supplies the electric motor 23 with an electrical current corresponding to the value of the control signal SCp. In particular, in the case of a three-phase electric motor, the power circuit 38 may include a servo loop applying the value of the in-quadrature electrical current iq to that of the control signal SCp, with the value of the direct current id being kept at zero by a servo loop.

The co-pilot's side stick 50 is similar to that 20 of the pilot, and comprises calculation means comprising an impedance control block 56 that is adapted to receive the position signal θcop supplied by the position sensor 52 and to supply a theoretical control force Fcmd_cop which the co-pilot should exert on the manoeuvring handle 51.

The position signal θcop coming from the position sensor 52 is transmitted directly to a reference table 62 that is adapted to supply a first value for the control force as a function of the position θcop.

The signal θcop is also differentiated with respect to time to give a first derivative 63 in order to supply a signal ωcop corresponding to the speed of displacement of the manoeuvring handle 51. This signal ωcop is transmitted to a second reference table 64 that is adapted to supply a value for the force corresponding to a shock-absorbing force as a function of the speed of displacement of the manoeuvring handle 51.

Similarly, the signal ωcop is used to give a second derivative 65 with respect to time in order to supply a signal γcop representing the acceleration of the manoeuvring handle 51. This signal γcop is transmitted to the input of a third reference table 66 to obtain a value for the control force corresponding to the inertia of the manoeuvring handle 51.

As a variant, the values ωp and γp may be measured directly by the speed and acceleration sensors rather than being calculated from the position signal θp.

The three control force values are then added to one another in a summer 67 to provide a value Fcmd_cop representing the resultant of the theoretical control force.

This theoretical control force Fcmd_cop is transmitted to a comparator 59, in which it is compared to a value ΣF of the sum of the forces Fp and Fcop measured by the torque sensors 24 and 54 respectively.

The value ΣF is delivered by a summer 60, which on the one hand receives the value Fcop of the torque exerted by the co-pilot on his or her manoeuvring handle as delivered by the torque sensor 54, and on the other receives the value Fp of the torque exerted by the pilot on his or her manoeuvring handle as delivered by the torque sensor 24, by way of a coupling switch 61 that is controlled by the coupling signal delivered by the coupling controller 41. When the coupling switch 61 is open, the two piloting members 21, 51 are no longer coupled, with only the value Fcop of the torque exerted by the co-pilot on his or her manoeuvring handle being taken into account by the comparator 59. By contrast, when the coupling switch 61 is closed, the two piloting members are coupled, with the sum ΣF of the measured forces Fp and Fcop being taken into account by the comparator 59.

The comparator 59 delivers a signal corresponding to a torque error to a controller 57, in which this torque error is converted to a signal of electrical current intended for the electric motor 53.

The output from the controller 57 is transmitted to a saturator 58, named the force saturator 58, in which the current signal delivered by the controller 57 is limited to predetermined saturation values SCcopsat+, in a first direction of the force exerted on the manoeuvring handle 51, and SCcopsat− in the other direction of the force exerted on the manoeuvring handle 51. The output from the force saturator 58 delivers a control signal SCcop for the electric motor 53 that is representative of a variation in torque to be applied to the shaft of the pitch axis of the manoeuvring handle 51.

In this first embodiment, just as for the pilot's side stick 20, for the co-pilot's side stick 50 the saturation values SCcopsat+, SCcopsat− used by the force saturator 58 are predetermined fixed values stored in a memory 69. These values are thus also adjustable, it being possible to write to the memory 69 in order to enable the device for coupling to be configured as a function of the features required for the piloting device, at the time of manufacture thereof and/or at the user's request.

The saturation values SCcopsat+, SCcopsat− are also selected and adjusted according to the invention in order to produce a function of disconnecting the two side sticks 21,

51. Thus, the saturation values SCcopsat+, SCpsat– are selected such that the force-feedback applied to the manoeuvring handle 51 by the electric motor 53 when the control signal SCcop is equal to one or other of these saturation values SCcopsat+, SCcopsat– brings about a force on the manoeuvring handle 51 whereof the absolute value measured at the force application centre of the manoeuvring handle 51 is between 4 daN and 40 daN. In practice, the saturation values SCcopsat+, SCcopsat– may be determined by experiment once a force-feedback value has been selected at the force application centre of the manoeuvring handle 51 that is between 4 daN et 40 daN, by placing a dynamometer at this force application centre and varying the different values of the control signal SCcop until the selected value is obtained.

In this case too, it is not necessary to make the saturation value SCcopsat+ in one direction of displacement of the manoeuvring handle 51 equal to the saturation value SCcopsat– in the other direction of displacement of the manoeuvring handle 51. In any case, to obtain the function of disconnecting the side sticks, the two saturation values SCcopsat+, SCcopsat– are both selected to bring about a force of between 4 daN and 40 daN at the force application centre of the manoeuvring handle 51.

A saturation detector 72 is associated with the force saturator 58 in order to detect the fact that the output from the force saturator 58 has a value equal to one or the other of the saturation values SCcopsat+, SCcopsat–. The signal delivered by this saturation detector 72 is supplied via a filter 73 to software 74 that in particular allows the triggering of warning signals and/or actions for the co-pilot and/or pilot.

The saturation values SCpsat+, SCpsat– used for the pilot's side stick 20 are equal or not equal to the saturation values SCcopsat+, SCcopsat– used for the co-pilot's side stick 50.

The control signal SCcop is supplied to the input of a power circuit 68 which supplies the electric motor 53 with an electrical current corresponding to the value of the control signal SCcop. In particular, in the case of a three-phase electric motor, the power circuit 68 may include a servo loop applying the value of the in-quadrature electrical current iq to that of the control signal SCp, with the value of the direct current id being kept at zero by a servo loop.

In FIG. 2, only the servo device of the pilot's side stick 20 is shown, it being understood that the servo device of the co-pilot's side stick 50 may be identical. The second embodiment, shown in FIG. 2, differs from the first embodiment in FIG. 1 in that the saturation values SCpsat+, SCpsat–, SCcopsat+, SCcopsat– are not predetermined fixed values but, on the contrary, are dynamically variable.

To achieve this, a controller 45 dynamically determines the saturation values SCpsat+, SCpsat– and transmits them to the force saturator 28. This controller 45 may be formed by a regulator, for example selected from a PI (proportional integral) regulator and a PID (proportional integral derivative) regulator whereof the function is to provide servo control of the saturation values as a function of a force difference.

In the example shown in FIG. 2, the controller 45 determines the saturation values SCpsat+, SCpsat– as a function of a difference between the absolute value |Fp| of the torque exerted by the pilot on his or her manoeuvring handle, as delivered by the torque sensor 24, and a reference value Fref. The reference value Fref is itself dynamically determined from the position signal θp coming from the position sensor 22, by means of a rule defining the reference value Fref as a function of this measured position. To achieve this, the torque value Fp exerted by the pilot on his or her manoeuvring handle as delivered by the torque sensor 24 is supplied to the input of a circuit 46 that delivers at its output the absolute value |Fp| at its input, with the output from this circuit 46 being linked to the negative input of a comparator 47. Moreover, the position signal θp coming from the position sensor 22 is transmitted to a reference table 48 that is adapted to supply the reference value Fref, which is transmitted to the positive input of the comparator 47.

There is nothing to prevent, as a variant, the reference value Fref from being either a predetermined fixed value stored in a memory and where appropriate adjustable by the user, or in contrast dynamically determined from the position signal θp and/or from the speed signal ωp and/or from the acceleration signal γp (it being possible for example to replace the reference table 48 with a block similar to the block 26 mentioned above). Nor is there anything to prevent, as a variant or in combination, the reference value Fref for the pilot's side stick 20 from being determined from the measured position and/or the measured speed and/or the measured acceleration and/or the measured force on the other side stick 50, that of the co-pilot.

In FIG. 3, only the servo device of the pilot's side stick 20 is shown, it being understood that the servo device of the co-pilot's side stick 50 may be identical. The third embodiment shown in FIG. 3 differs from that in FIG. 1 only in that the servo device of the electric motor 23 is an admittance control device and not an impedance control device. To achieve this, the signal giving the measured value Fp of the torque exerted by the pilot on his or her manoeuvring handle 21 as delivered by the torque sensor 24 and the signal giving the measured value Fcop of the torque exerted by the co-pilot on his or her manoeuvring handle 51 as delivered by the torque sensor 54 are transmitted to the input of a summer 80 whereof the output delivers the sum ΣF of the measured forces Fp and Fcop. This sum ΣF is transmitted to the input of a reference table 81 delivering a reference position signal θref which is compared by a comparator 82 to a position signal θp coming from the position sensor 22. The reference table 81 represents a static rule determining the sensation of force-feedback applied by the electric motor 23 to the manoeuvring handle 21. The comparator 82 delivers, at its output, a position error signal Δθ=θref−θp that is supplied to the input of a position controller 83, which delivers at its output a speed reference signal ωref, and the latter is compared by a comparator 84 to the value of the speed of displacement signal ωp of the manoeuvring handle 21, which can be calculated from the position signal θp or measured directly at the shaft of the manoeuvring handle. The comparator 84 delivers, at its output, a speed error signal Δω=ωref−ωp that is transmitted to the input of a speed controller 85 whereof the output delivers a signal of electrical current intended for the electric motor 23.

The position controller 83 and the speed controller 85 form a train 90 that determines the dynamic feature of the sensation of force-feedback applied by the motor 23 to the manoeuvring handle 21. It should be noted that, as a variant which is not shown, this train 90 determining the dynamic feature of the sensation of force-feedback may be simplified in order to comprise only the position controller 83 (without the speed control 85), or may be modified to replace the speed controller 85 by an acceleration controller, or indeed may be supplemented by an acceleration controller of this kind.

The output of the latter controller of the train 90, that is to say the speed controller 85 in the embodiment in FIG. 3, is transmitted to the saturator 28, which supplies the control signal for the motor 23, as in the first embodiment in FIG. 1.

The embodiment in FIG. 4 differs from that in FIG. 3 in that the saturation values SCpsat+, SCpsat− are dynamically variable and are delivered by a controller 45, as in the second embodiment in FIG. 2. In the variant in FIG. 4, the reference value Fref is nonetheless a predetermined fixed value that is stored in a memory 49 linked to the positive input of the comparator 47.

Thus, in all the embodiments of the invention, the force saturators 28, 58 limit the value of the control signals for the electric motors 23, 53 to saturation values for which the force-feedback applied to the manoeuvring handles meets the conditions of disconnection of the coupling between the side sticks 20, 50.

A very large number of variant embodiments may be applied to the invention by comparison with the individual embodiments shown in the figures and described above. For example, a single servo device may be provided to control the two side sticks (instead of the two servo devices that are each specific to one of them); just one single common saturator may be provided (subject to the redundancy for safety provided on board aircraft) in order to deliver the control signals for the electric motors of the two side sticks; more complex software may be provided for determining the saturation values SCpsat+, SCpsat−, SCcopsat+, SCcopsat− enabling disconnection to be brought about; ways of adjusting these saturation values with the aid of dynamometers, as indicated above, may be provided during the maintenance operations for the piloting device, or even in the course of operation, for example before each use; disconnection, by an appropriate selection of the saturation values SCpsat+, SCpsat−, SCcopsat+, SCcopsat− according to the invention, may be applied to all the degrees of freedom of the piloting members or only to some of them, or even in a single direction of displacement (and force) of one degree of freedom of the piloting members; different saturators may be used to bring about the function of disconnecting for the different degrees of freedom of the piloting members, or by contrast a single saturator may be used to bring about the function of disconnecting of the different degrees of freedom of the piloting members; specific position and/or speed and/or acceleration and/or force sensors may be added to the drive train for mounting each piloting member in order to produce the device and the method for coupling according to the invention, or by contrast the sensors used may be those already provided originally on the piloting members for the fly by wire system; the invention may be applied to piloting members other than side sticks, such as control columns, control levers for throttle control, etc.

The invention claimed is:

1. A method for coupling piloting members, the method comprising:—a servo device delivering a respective control signal to each piloting member,
wherein each piloting member comprises i) a manoeuvring handle which is movable in relation to an underframe and has a force application center, and ii) at least one force actuator which is suitable for exerting a force, named a force-feedback, on the manoeuvring handle of the piloting member, and
wherein the servo device delivers the respective control signal to each force actuator of each piloting member, each force actuator exerting the force-feedback on each manoeuvring handle at a force-feedback value determined by the respective control signal supplied to each force actuator of the piloting member, at a value (SCp, SCcop) of the respective control signal that is determined by the servo device to ensure a coupling link between the piloting members,
at least one saturator of the servo device, named at least one force saturator, limiting the value (SCp, SCcop) of each respective control signal so that the value (SCp, SCcop) of each respective control signal remains within a range of values [SCpsat−, SCpsat+], [SCcopsat−, SCcopsat+] delimited by a lower saturation value (SCpsat−, SCcopsat−) and an upper saturation value (SCpsat+, SCcopsat+),
when disconnection conditions are met, performing a function of disconnecting the piloting members,
wherein the lower and upper saturation values provide that the force-feedback is exerted at a force-feedback value, taken at the force application center of the manoeuvring handle, of between 4 daN and 40 daN, with the result that the function of disconnecting is determined exclusively by the at least one force saturator limiting the value (SCp, SCcop) of the respective control signals so that the value (SCp, SCcop) of each respective control signal remains within the range of values [SCpsat−, SCpsat+], [SCcopsat−, SCcopsat+] delimited by the lower and upper saturation values (SCpsat−, SCcopsat−; SCpsat+, SCcopsat+).

2. The method according to claim 1, wherein at least one of the lower and upper saturation values (SCpsat−, SCpsat+, SCcopsat−, SCcopsat+) is variable and is delivered to the at least one force saturator by a dynamic monitoring circuit of the at least one force saturator.

3. The method according to claim 2, wherein at least one of the lower and upper saturation values (SCpsat−, SCpsat+, SCcopsat−, SCcopsat+) is determined by the dynamic monitoring circuit as a function of a difference between a measured force exerted on the manoeuvring handle and a reference value (Fref).

4. The method according to claim 3, wherein at least one reference value (Fref) for at least one of the lower and upper saturation values (SCpsat−, SCpsat+, SCcopsat−, SCcopsat+) is a predetermined fixed value.

5. The method according to claim 4, wherein at least one reference value (Fref) for at least one of the lower and upper saturation values (SCpsat−, SCpsat+, SCcopsat−, SCcopsat+) is a variable value dependent on a measurement of at least one dynamic status parameter of the manoeuvring handle that is selected from position, speed, and acceleration.

6. The method according to claim 3, wherein at least one reference value (Fref) for at least one of the lower and upper saturation values (SCpsat−, SCpsat+, SCcopsat−, SCcopsat+) is a variable value dependent on a measurement of at least one dynamic status parameter of the manoeuvring handle that is selected from position, speed and acceleration.

7. A device for coupling between piloting members, comprising:
a servo device connected to the piloting members, each piloting member comprising:
a manoeuvring handle which is movable in relation to an underframe and has a force application center,—
at least one force actuator which is suitable for exerting a force, named a force-feedback, on the manoeuvring handle of the piloting member,
wherein the servo device delivers a respective control signal to each force actuator of each piloting member,
the force-feedback being exerted on each manoeuvring handle at a force-feedback value determined by the control signal supplied to each force actuator of the piloting member, at a value (SCp, SCcop) of the respective control signal that is determined by the servo device to ensure a coupling link between the piloting members, at least one saturator, named the force saturator, that limits the value (SCp, SCcop) of the respective control signal of each piloting member such that the value (SCp, SCcop) of each respective control signal remains within a range of values [SCpsat−, SCpsat+], [SCcopsat−, SCcopsat+] delimited by a lower saturation value (SCpsat−, SCcopsat−) and an upper saturation value (SCpsat+, SCcopsat+), wherein the servo device performs a function of disconnecting the piloting members when disconnection conditions are met, wherein the lower and upper saturation values provide that the force-feedback exerted has a force-feedback value, taken at the force application center of the manoeuvring handle, of between 4 daN and 40 daN, with the result that the function of disconnecting is determined exclusively by the at least one force saturator limiting the value (SCp, SCcop) of the respective control signals so that the value (SCp, SCcop) of each respective control signal remains within the range of values [SCpsat−, SCpsat+], [SCcopsat−, SCcopsat+] delimited by the lower and upper saturation values (SCpsat−, SCcopsat−; SCpsat+, SCcopsat+).

8. The device according to claim 7, wherein said at least one force saturator comprises a memory in which at least one of the lower and upper saturation values (SCpsat−, SCpsat+, SCcopsat−, SCcopsat+) is stored.

9. The device according to claim 7, further comprising a dynamic monitoring circuit of the at least one force saturator that is adapted for delivery to the at least one force saturator of at least one of the lower and upper saturation values (SCpsat−, SCpsat+, SCcopsat−, SCcopsat+), the at least one of the lower and upper saturation values (SCpsat−, SCpsat+, SCcopsat−, SCcopsat+) being variable.

10. The device according to claim 9, wherein said dynamic monitoring circuit comprises a regulation loop of at least one of the lower and upper saturation values as a function of a difference between i) a measured force value exerted on the manoeuvring handle as delivered by at least one force-measuring sensor and ii) a reference value (Fref).

11. The device according to claim 10, wherein said dynamic monitoring circuit is adapted to have at least one predetermined fixed reference value (Fref) for at least one of the lower and upper saturation values (SCpsat−, SCpsat+, SCcopsat−, SCcopsat+).

12. The device according to claim 11, wherein said dynamic monitoring circuit comprises, for at least one of the lower and upper saturation values (SCpsat−, SCpsat+, SCcopsat−, SCcopsat+), at least one sensor for measuring at least one dynamic status parameter of the manoeuvring handle that is selected from position, speed, and acceleration, and is adapted to adopt, as the reference value (Fref), a variable value dependent on at least one measurement value as delivered by the at least one sensor for measuring at least one dynamic status parameter of the manoeuvring handle that is selected from position, speed, and acceleration.

13. The device according to claim 10, wherein said dynamic monitoring circuit comprises, for at least one of the lower and upper saturation values (SCpsat−, SCpsat+, SCcopsat−, SCcopsat+), at least one sensor for measuring at least one dynamic status parameter of the manoeuvring handle that is selected from position, speed, and acceleration, and is adapted to adopt, as the reference value (Fref), a variable value dependent on at least one measurement value as delivered by the at least one sensor for measuring at least one dynamic status parameter of the manoeuvring handle that is selected from position, speed, and acceleration.

14. The device according to claim 10, wherein said dynamic monitoring circuit is adapted to have at least one predetermined fixed reference value (Fref) for each of the lower and upper saturation values (SCpsat−, SCcopsat−; SCpsat+, SCcopsat+).

15. A piloting device comprising at least two of the piloting members and the device for coupling the at least two piloting members according to claim 7.

16. An aircraft comprising the piloting device according to claim 15.

\* \* \* \* \*